United States Patent
Bruins et al.

(10) Patent No.: US 9,530,146 B2
(45) Date of Patent: Dec. 27, 2016

(54) MARKETING THE USE OF AN ACIDIC SOFT DRINK TO ENHANCE THE EFFICACY OF A GLUTEN-DIGESTING ENZYME

(71) Applicant: DSM IP ASSETS B.V., Heerlen (NL)

(72) Inventors: Maaike Johanna Bruins, Kaiseraugst (CH); Frits Koning, Kaiseraugst (CH); Veronica Montserrat, Kaiseraugst (CH)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/477,010

(22) Filed: Sep. 4, 2014

(65) Prior Publication Data

US 2015/0064162 A1    Mar. 5, 2015

Related U.S. Application Data

(60) Provisional application No. 61/874,084, filed on Sep. 5, 2013, provisional application No. 61/876,889, filed on Sep. 12, 2013.

(51) Int. Cl.
*G06Q 30/02*    (2012.01)

(52) U.S. Cl.
CPC ................................ *G06Q 30/0241* (2013.01)

(58) Field of Classification Search
CPC ....................................................... A61K 38/48
See application file for complete search history.

(56) References Cited

FOREIGN PATENT DOCUMENTS

| NL | WO 2006005757 A2 * | 1/2006 | ............. A61K 38/06 |
|----|--------------------|--------|-------------------------|
| WO | WO 0245524 A2 *    | 6/2002 | ................ A23J 3/16 |

* cited by examiner

*Primary Examiner* — Bin Shen
(74) *Attorney, Agent, or Firm* — Nixon & Vanderhye P.C.

(57) ABSTRACT

This invention relates to a method of marketing a gluten-digesting enzyme supplement comprising providing an effective amount of a gluten-digesting enzyme to a person desirous of maintaining or enhancing gastro intestinal comfort or delaying the onset of gastrointestinal discomfort; or desirous of reducing gluten exposure, and informing the gluten sensitive individuals of the ability to increase the efficacy of the supplement by drinking one serving of an acidic soft drink having a pH in a range from 2 to 3.5. Furthermore, it relates to a kit comprising a gluten-digesting enzyme supplement and instructions for use in combination with an acidic soft drink having a pH in a range from 2 to 3.5.

10 Claims, 1 Drawing Sheet

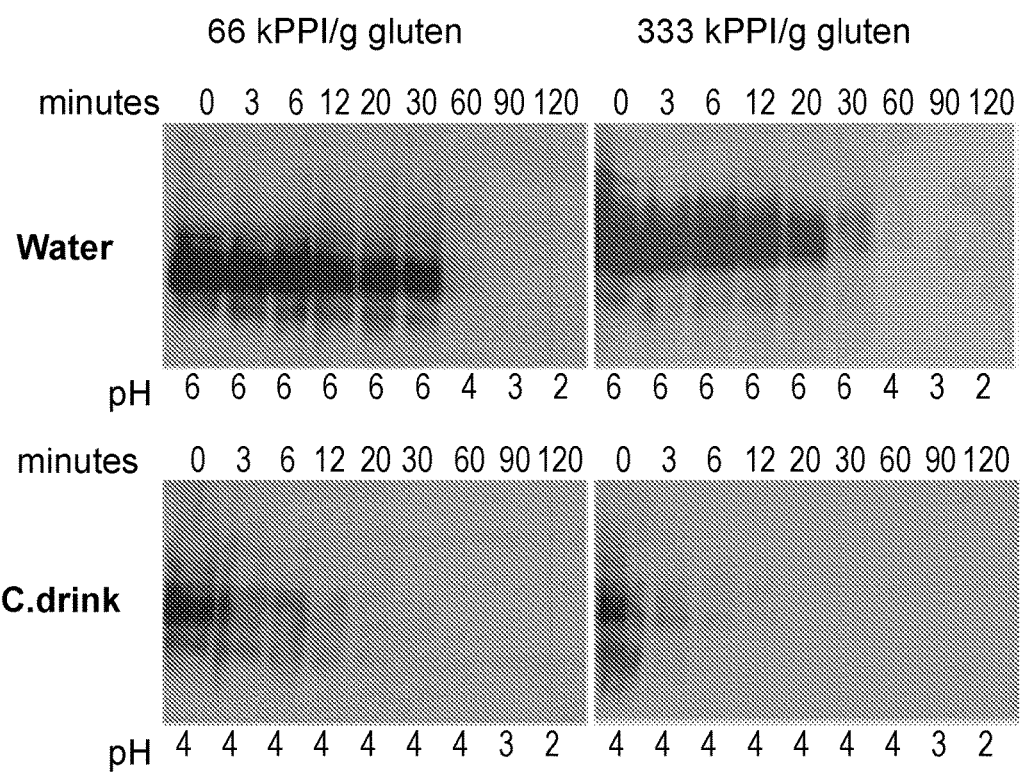

MARKETING THE USE OF AN ACIDIC SOFT DRINK TO ENHANCE THE EFFICACY OF A GLUTEN-DIGESTING ENZYME

This application is claims the benefit of U.S. Provisional Application No. 61/874,084 filed Sep. 5, 2013 and U.S. Provisional Application No. 61/876,889 filed Sep. 12, 2013, the entire contents of each of which are hereby incorporated by reference.

BRIEF DESCRIPTION OF THE INVENTION

This invention relates to a business method, mainly to the method of marketing a gluten-digesting enzyme supplement for the purpose of maintaining or enhancing gastrointestinal comfort in gluten sensitive individuals, or for delaying the onset of gastrointestinal discomfort in celiac or non-celiac gluten sensitive individuals, as well as for decreasing gluten exposure in a healthy individual.

BACKGROUND OF THE INVENTION

Celiac disease, also known as celiac sprue, gluten-sensitive enteropathy, or gluten intolerance is one of the most frequent food intolerances worldwide, with highest prevalence in Europe, North and South America, and Australia. Celiac disease is an inflammatory disease of the upper small intestine in genetically predisposed persons triggered by the ingestion of wheat, barley, rye and their cross-related varieties leading to a mal-absorption syndrome.

Gluten is a common dietary protein present in wheat, barley, rye and their cross-related varieties. Gluten is a complex mixture of glutamine- and proline-rich glutenin and prolamine molecules, which is thought to be the responsible factor for celiac disease induction in sensitive human individuals.

Ingestion of such proteins by sensitive individuals produces flattening of the normally luxurious, rug-like, epithelial lining of the small intestine known to be responsible for efficient and extensive terminal digestion of peptides and other nutrients. Clinical symptoms of Celiac Sprue include fatigue, chronic diarrhea, mal-absorption of nutrients, weight loss, abdominal distension, anemia, as well as a substantially enhanced risk for the development of osteoporosis and intestinal malignancies (lymphoma and carcinoma). The disease has an incidence of approximately 1 in 200 in European and North American populations.

There is some discrepancy about who/when people develop gluten intolerance. Some medical authorities claim there are two peak periods during which onset takes place. The first being infancy, between six months to two years of age, and the second being between the ages of thirty and fifty years. Women are more prone to gluten intolerance than men.

The current essential treatment of gluten intolerance is a permanent strict withdrawal of gluten form the diet. It is however important to define two categories of gluten intolerance in order to understand how the illness is affected by enzyme action in the gut. Celiac sprue is an autoimmune condition, a genetic inflammatory disorder of the small intestine. When gluten proteins break down during digestion, they fragment. These protein fragments are called peptides. In celiac sufferers, an inappropriate immune system response in the small intestine is initiated by one type of peptide, and the intestinal cells are damaged.

A second type of gluten intolerance results when the gut is injured by something other than celiac disease—the negative effect of a bacteria or yeast infection, for example, resulting in the loss of the intestinal enzymes which in turn leads to poor gluten digestion. While supplementing individuals with enzymes may be beneficial to celiac sufferers, they must remain on a strictly gluten free diet because of the possible strength of the reaction.

Using specific enzymes as supplement can be effective in minimizing the need for a gluten-free diet for those individuals at risk of developing gluten intolerance, or wherein gluten intolerance is due to gut injury.

The use of exogenous proteolytic enzymes for gluten detoxification is one of the most promising strategies for celiac disease treatment. Such enzymes have been used in both pretreatment of gluten containing flours, and as supplements. Prolyl-endoproteases are known gluten-digesting enzymes which have been shown to digest gliadin peptides.

WO 02/45524 and WO 02/46381 both disclose a proline specific endoprotease, and the use of said proline specific endoprotease for hydrolyzing proline rich peptides.

WO2013/083338 discloses recently identified specific proteolytic enzymes isolated from an *Actinoallomurus* strain which can be used in food processing to hydrolyze gluten.

However, the kinetics of the above referenced enzymes is not optimal when used as a supplement leading to a need to largely overdose the enzyme ingested by an individual in order to guarantee a timely digestion of the gluten, and to limit gluten exposure in the gastrointestinal tract.

It would be desirable to provide a safe an effective way to maintain or enhance gastrointestinal comfort in gluten sensitive individuals, or for delaying the onset of gastrointestinal discomfort in celiac or non-celiac gluten sensitive individuals, as well as for decreasing gluten exposure in a healthy individual.

DETAILED DESCRIPTION OF THE INVENTION

It has been found, in accordance with this invention that the efficacy of a gluten-digesting enzyme is stimulated by addition of an acidic soft drink having a pH in a range from 2 to 3.5.

Thus one aspect of this invention is the method of marketing a gluten-digesting enzyme supplement for maintaining or enhancing gastrointestinal comfort in gluten sensitive individuals, or for delaying the onset of gastrointestinal discomfort in celiac or non-celiac gluten sensitive individuals, as well as for decreasing gluten exposure in a healthy individual.

One aspect of the invention is directed to a method of marketing an acidic soft drink having a pH in a range from 2 to 3.5 to maintain or enhance gastrointestinal comfort in gluten sensitive individuals, or for delaying the onset of gastrointestinal discomfort in celiac or non-celiac gluten sensitive individuals, as well as for decreasing gluten exposure in healthy individuals comprising:

a) providing one serving of an acidic soft drink having a pH in a range from 2 to 3.5 alone or together with a gluten-containing meal, b) informing the gluten sensitive individuals of the increased the efficacy of the endogenous gluten-digesting enzyme, thereby decreasing gluten exposure in celiac or healthy gluten-sensitive individuals.

Another aspect of this invention is directed to a method of marketing a gluten-digesting enzyme supplement to maintain or enhance gastrointestinal comfort in gluten sensitive individuals, or for delaying the onset of gastrointestinal discomfort in celiac or non-celiac gluten sensitive individuals, as well as for decreasing gluten exposure in healthy individuals comprising:

a) providing an effective amount of a gluten-digesting enzyme to a person desirous of maintaining or enhancing gastro intestinal comfort or delaying the onset of gastrointestinal discomfort; or desirous of reducing gluten exposure, and b) informing the gluten sensitive individuals of the ability to increase the efficacy of the supplement by drinking one serving of an acidic soft drink having a pH in a range from 2 to 3.5.

Another aspect of this invention is directed to a kit comprising a gluten-digesting enzyme supplement and instructions for use in combination with an acidic soft drink having a pH in a range from 2 to 3.5.

Definitions

As used throughout the specification and claims, the following definitions apply:

"Gluten-digesting enzyme"—this is an enzyme capable of degrading gluten (complex mixture of glutamine- and proline-rich glutenin and prolamine molecules). It can be any type of endoprotease, but the preferred endoprotease is a prolyl-endopeptidase. Prolyl endopeptidase is a large cytosolic enzyme that belongs to a distinct class of serine peptidases. It was first described in the cytosol of rabbit brain as an oligopeptidase, which degrades the nonapeptide bradykinin at the Pro-Phe bond. The enzyme is involved in the maturation and degradation of peptide hormones and neuropeptides such as alpha-melanocyte-stimulating hormone, luteinizing hormone-releasing hormone (LH-RH), thyrotropin-releasing hormone, angiotensin, neurotensin, oxytocin, substance P and vasopressin. PREP cleaves peptide bonds at the C-terminal side of proline residues. Its activity is confined to action on oligopeptides of less than 10 kD and it has an absolute requirement for the trans-configuration of the peptide bond preceding proline.

"Gastrointestinal comfort"—is central to the quality of life. Promoting gastrointestinal digestive comfort includes regulating transit time through the gastrointestinal tract and easing the pain associated with digestion and associated disorders.

"Non-celiac gluten sensitive"—Non-celiac gluten sensitivity has been coined to describe those individuals who cannot tolerate gluten and experience symptoms similar to those with celiac disease but yet who lack the same antibodies and intestinal damage as seen in celiac disease. Non-celiac gluten sensitivity is an innate immune response, as opposed to an adaptive immune response (such as autoimmune) or allergic reaction. Non-celiac gluten sensitivity shares many symptoms with celiac disease. However, according to Sapone et al. (2012), individuals with non-celiac gluten sensitivity have a prevalence of extra intestinal or non-gastrointestinal symptoms, such as headache, "foggy mind," joint pain, and numbness in the legs, arms or fingers. Symptoms typically appear hours or days after gluten has been ingested, a response typical for innate immune conditions like non-celiac gluten sensitivity.

"Healthy individual"—when used in context of this invention, the healthy individual has not been diagnosed as having a celiac disease, but may be desirous to reduce gluten exposure.

"Delaying the onset" is meant to include amelioration of the condition, lessening of the severity of the symptoms, early intervention, and lengthening the duration of time prior to the onset of the disease, and is not intended to be limited to a situation where the patient is unable to experience any symptoms of gastrointestinal discomfort.

FIGURE LEGENDS

FIG. 1: *Aspergillus niger* prolyl endopeptidase (AN-PEP) activity in the presence of an acidic soft drink: A suspension of gluten powder in water was incubated in the presence or absence of an acidic soft drink (Coca Cola) under stomach-like conditions in the presence of either 66'000 PPI (Protease Picomole International) or 333'000 PPI AN-PEP/g gluten. The samples were taken at indicated time points. From the water-insoluble fraction the presence of DQ2.5-glia-α1 epitopes was determined by Western blot as well as from the water-soluble fraction the presence of DQ2.5-glia-α3 was determined by ELISA.

In all embodiments of the present invention, the gluten-digesting enzyme supplement comprises a prolyl endopeptidase, more preferably, an *Aspergillus niger* prolyl endopeptidase. Moreover, in another preferred embodiment, the supplement can be in the form of a tablet, a capsule, a sachet, or any other dosage form. Most preferred form is in the form of tablet or capsule. The capsules, tablets or sachets or other dosage forms may be in a container which may take any conventional form. For example the dosage forms may be sold in a jar, bottle, tin box, pot, dispenser, or the like which contains the dosage forms in a predetermined quantity, such as a 30-day supply, a 60-day supply, a 90-day supply or in whatever quantity which is desired.

Additionally and optionally, the capsules may be in a blister pack, wherein each blister contains a predetermined number of capsules, usually a single dose (typically 1-4 capsules). The arrangement of the number of capsules in a blister, the number of blisters on a single blister pack strip, and the number of blister pack strips which are sold in a group may be any convenient amounts or configurations.

In all embodiments of the present invention, the acidic soft drink is preferably carbonated; meaning carbon dioxide gas under pressure has been dissolved in the soft drink. This process, known as carbonation, is a process that causes the drink to become effervescent.

In all embodiments of the present invention, the acidic soft drink may further comprises 1 to 500 mmole per liter of phosphoric acid, preferably 50 to 300 mmole per liter of phosphoric acid. Phosphoric acid (also known as orthophosphoric acid or phosphoric(V) acid) is a mineral (inorganic) acid having the chemical formula $H_3PO_4$. Orthophosphoric acid molecules can combine with themselves to form a variety of compounds which are also referred to as phosphoric acids, but in a more general way. The term phosphoric acid can also refer to a chemical or reagent consisting of phosphoric acids, such as pyrophosphoric acid or triphosphoric acid, but usually orthophosphoric acid.

Furthermore, the acidic soft drink may also comprise 10 to 500 mg/liter caffeine, and/or 10 mg/liter to 45 g/liter caramel, and/or 20 to 60 g/liter carbohydrate.

In all embodiments of the present invention, the acidic soft drink may further comprise 0.1 to 2 g/serving vitamin C.

Alternatively, in all embodiments of the present invention, the acidic soft drink may further comprise one or more artificial sweetener. Sweeteners re preferably selected from stevia, aspartame, sucralose, neotame, acesulfame potassium, and saccharin in replacement of a carbohydrate. Preferred artificial sweetener according to the present invention is from stevia.

In another preferred embodiment, the effective amount of gluten-digesting enzyme supplement provides 10'000 to 100'000 PPI of gluten-digesting enzyme, preferably 20'000 to 80'000 PPI of gluten-digesting enzyme. One PPI (Protease Picomole International) is defined as the amount of enzyme that releases one picomole of p-nitroanilide per second at 37° C. in a citrate/disodium phosphate buffer (pH 4.6) using 0.37 mM Z-Gly-Pro-pNA (Bachem, Bubendorf, Switzerland) as substrate.

Alternatively, PPU may also be used to define the glutenase activity. Proline Protease Unit (PPU) is defined as the amount of enzyme that releases 1 μmol of p-nitroanilide per minute at 37° C. in a citrate/disodium phosphate buffer (pH 4.6) using 0.37 mM Z-Gly-Pro-pNA (Bachem, Bubendorf, Switzerland) as substrate. The AN-PEP sample used has a specific activity of 15.7 PPU/g. The conversion factor between PPI and PPU is 1 PPU=16'667 PPI.

In all embodiments according to present invention, the serving of acidic soft drink is preferably in the range of 0.1 to 0.8 liters, more preferably, in the range of 0.3 to 0.5 liters.

In another preferred embodiment, the acidic soft drink and the gluten-digesting enzyme are consumed by the individual in a ratio of 0.1 L/10'000 Protease Picomole International units to 1 L/10'000 Protease Picomole International units.

In yet another embodiment, the gluten-digesting enzyme supplement is provided as a kit further comprising instructions for administering the supplement to a human.

Another aspect of this invention is directed to a kit comprising a gluten-digesting enzyme supplement and instructions for use in combination with an acidic soft drink having a pH in a range from 2 to 3.5. The kit which is provided may be comprised of multiple dosages of gluten-digesting enzyme. The separate dosages may be enclosed in a container: e.g., bottle, blister pack, or vial rack. Further, instructions for administering the composition as a dosage to a human are preferably also provided as part of the kit.

Informational material may be part of the material used to package the dosage forms. For example, if the dosage forms are packaged in a container which may be re-opened and closed, such as a jar, bottle, or pot, then the informational material may be printed on a label which is affixed to the outside of the container. Alternatively and/or additionally, the informational material may be on a separate insert which is placed in a box, envelope, or the like which holds the container. In instances where the dosage forms are packaged in a blister pack or the like, the informational material may be printed on the blister pack strip, on a receptacle such as a box or envelope containing the blister pack strips, and/or included in a package insert placed inside the box or envelope containing the blister packs. The exact form of the informational material is not critical to this invention as long as the information provided informs the user as to the benefits of the gluten-digesting enzyme when administered together or within 30 minutes with one serving of an acidic soft drink having a pH in a range from 2 to 3.5 to maintain or enhance gastrointestinal comfort in non-celiac gluten sensitive healthy individuals, or delaying the onset of gastrointestinal discomfort in non-celiac gluten sensitive healthy individuals.

Alternatively and/or additionally, the informational material need not be physically associated with the kit. For example, the informational material may be in the form of printed leaflets, flyers, advertising placards, or the like which is displayed in the proximity (preferably within one meter) of the kit. The informational material may be in a form which allows the potential consumer to take a printed material (such as a hand-out, flier, postcard or the like) or may merely impart information. The information may be provided to the customer through conventional marketing methods using a variety of media, such as through mass communication advertising (television/radio advertising, print advertising such as in magazines, internet marketing and advertising such as through web sites, social networking sites, and the like). The important point is that the consumer is informed about at least one benefit of the use of as to the benefits of the gluten-digesting enzyme when administered together or within 30 minutes with one serving of an acidic soft drink having a pH in a range from 2 to 3.5 to maintain or enhance gastrointestinal comfort in gluten sensitive individuals, or for delaying the onset of gastrointestinal discomfort in celiac or non-celiac gluten sensitive individuals, as well as for decreasing gluten exposure in a healthy individual.

Information Imparted

The information which is to be imparted should include at least one of the following benefits. The exact wording to the benefit is not critical to this invention, as long as the prospective purchaser is informed of the benefit, but should impart information that the efficacy of a gluten-digesting enzyme is enhanced when administered together or within 30 minutes with one serving of an acidic soft drink having a pH in a range from 2 to 3.5 to maintain or enhance gastrointestinal comfort in gluten sensitive individuals, or for delaying the onset of gastrointestinal discomfort in celiac or non-celiac gluten sensitive individuals, as well as for decreasing gluten exposure in a healthy individual.

Additionally, the information may also include items such as dosages, instructions on how to consume the dosages, ingredients (both active and inert) of the dosages, and expiry date.

People who would potentially benefit from maintaining or enhancing gastrointestinal comfort in non-celiac gluten sensitive healthy individuals, or delaying the onset of gastrointestinal discomfort in non-celiac gluten sensitive healthy individuals would include celiac patients, non-celiac gluten-sensitive individuals and people desirous to decrease gluten exposure. The information may be specifically tailored to consumers experiencing gastrointestinal discomfort or not.

Thus, this invention would also be of particular interest to the following healthy groups of people who are desirous to preserve, enhance, or maintain their gastrointestinal comfort, whether they have been diagnosed as celiac or not.

Formulations

The nutraceutical and pharmaceutical compositions according to the present invention may be in any galenic form that is suitable for administering to humans, but oral forms are preferred, e.g. in solid form, such as additives/supplements for food, fortified food or feed, tablets, pills, granules, dragees, capsules, gummy formulations, and effervescent formulations such as powders and tablets, or in liquid form such as solutions, emulsions or suspensions as e.g. beverages, pastes and oily suspensions. The pastes may be encapsulated in hard or soft shell capsules, whereby the capsules feature e.g. a matrix of (fish, swine, poultry, cow) gelatin, plant proteins or lignin sulfonate. The dietary and pharmaceutical compositions may be in the form of controlled (delayed) release formulations.

The dietary compositions according to the present invention may further contain protective hydrocolloids (such as gums, proteins, modified starches), binders, film forming agents, encapsulating agents/materials, wall/shell materials, matrix compounds, coatings, emulsifiers, surface active agents, solubilizing agents (oils, fats, waxes, lecithins etc.), adsorbents, carriers, fillers, co-compounds, dispersing agents, wetting agents, processing aids (solvents), flowing agents, taste masking agents, weighting agents, gelling agents, gel forming agents, antioxidants and antimicrobials.

In addition the pharmaceutical or nutraceutical compositions according to the present invention may further contain conventional pharmaceutical additives and adjuvants, excipients or diluents, including, but not limited to, water, gelatin of any origin, vegetable gums, ligninsulfonate, talc, sugars, starch, cellulose, microcrystalline cellulose, gum arabic, vegetable oils, polyalkylene glycols, flavoring agents, preservatives, stabilizers, emulsifying agents, buffers, lubricants, colorants, wetting agents, fillers, and the like. The carrier material can be organic or inorganic inert carrier material suitable for oral/parenteral/injectable administration.

Dosages

The gluten-digesting enzyme supplement may be administered prior each meal with concomitant drinking of one serving of an acidic drink or preferably within 10 minutes of taking the supplement.

The gluten-digesting enzyme supplement provides from 10'000 to 100'000 Protease Picomole International units (PPI) of gluten-digesting enzyme, wherein the acidic soft drink and the gluten-digesting enzyme are consumed in a ratio of 0.1 L/10'000 PPI to 1 L/10'000 Protease Picomole International units.

The following non-limiting Examples are presented to better illustrate the invention.

EXAMPLES

Example 1

Use of an Acidic Soft Drink to Enhance the Efficacy of *Aspergillus niger* Prolyl-Endoprotease (AN-PEP).

In Vitro Digestion

Stomach conditions were mimicked in a mixture incorporating 2.2 g of wheat gluten powder (Amygluten 110, Syral, Aalst, Belgium, 77% protein of which 80% gluten), 1 mmol/l $NaHCO_3$, 18 µg/ml pepsin (Pepsin A, from Porcine Stomach Mucosa, ≥250 units/mg, Sigma, USA) in a total volume of 275 ml. The gluten mixture was incubated with the quantities of *Aspergillus niger* prolyl endopeptidase (AN-PEP) indicated under continuous stirring at 37° C. The pH of the mixture was lowered during the incubation as indicated. Samples of 1 mL were collected at several time points as indicated and immediately stored at −80° C. until further analysis. The soft drink used in the present assay is Coca Cola.

Testing of Various Parameters

The dose-response of AN-PEP on gluten degradation was determined by adding incremental enzyme doses to the incubation mixture. The effect of a carbonated soft drink on gluten degradation was tested by suspending 2.2 g gluten powder in a 1:1 (v/v) mixture of water and carbonated soft drink to reach a total volume of 275 ml.

A Carbonated Drink Improves AN-PEP Mediated Gluten Degradation

Gluten powder, artificial saliva, pepsin and AN-PEP (either 66,664 or 333,320 PPI/g of gluten) were incubated either in water or in a 1:1 mixture of water and a carbonated soft drink. Subsequently, both mixtures were incubated as described in FIG. 1, and the presence of gluten proteins and peptides were determined by Western blot and by ELISA (FIG. 1). The results indicate that gluten degradation in both the soluble and insoluble fraction was significantly faster in the presence of the carbonated soft drink, particularly at the highest enzyme concentration.

AN-PEP activity in the presence of a carbonated drink. A suspension of 2.2 g gluten powder in water was incubated in the presence of a carbonated drink or water under stomach-like conditions in the presence of either 66,664 or 333,320 PPI AN-PEP/g gluten. The samples were taken at indicated time points. From the water insoluble fraction the presence of DQ2.5-glia-α1 epitopes was determined by Western blot (upper panel) and from the water-soluble fraction the presence of DQ2.5-glia-α3 was determined by ELISA (lower panel).

Example 2

A 30 year old gluten sensitive woman took a dietary supplement containing 160'000 PPI *Aspergillus niger* prolyl endopeptidase (AN-PEP) with her gluten-free sandwich, and had a 330 mL of Diet Coke with it. She did not experience the gastrointestinal discomfort, as she often does, even after meals which only contain minor amounts of gluten (below 20 ppm).

What is claimed is:

1. A method of marketing a gluten-digesting enzyme supplement to maintain or enhance gastrointestinal comfort in a gluten sensitive individual, or for delaying the onset of gastrointestinal discomfort in a celiac or non-celiac gluten sensitive individual, as well as for decreasing gluten exposure in a healthy individual comprising:
   a) preparing an effective amount of the gluten-digesting enzyme supplement which comprises a prolyl endopeptidase to a person desirous of maintaining or enhancing gastro intestinal comfort or delaying the onset of gastrointestinal discomfort; or desirous of reducing gluten exposure, wherein the effective amount of prolyl endopeptidase provides 10,000 to 100,000 Protease Picomole International units of gluten-digesting enzyme activity, and
   b) providing informational material to the gluten sensitive individual of the ability to increase the efficacy of the supplement by drinking one serving of an acidic soft drink having a pH in a range from 2 to 3.5;
   wherein the acidic soft drink is carbonated; and
   wherein the acidic soft drink further comprises 1 to 500 mmole per liter of phosphoric acid.

2. The method according to claim 1, wherein the gluten-digesting enzyme supplement comprises an *Aspegillus niger* prolyl endopeptidase.

3. The method according to claim 1, wherein the gluten-digesting enzyme supplement is in the form of a tablet or a capsule.

4. The method according to claim 1, wherein the acidic soft drink further comprises 10 to 500 mg/liter caffeine.

5. The method according to claim 1, wherein the acidic soft drink further comprises 10 mg/liter to 45 g/liter caramel.

6. The method according to claim 1, wherein the acidic soft drink further comprises 20 to 60 g/liter carbohydrate.

7. The method according to claim 1, wherein the acidic soft drink further comprises one or more artificial sweetener.

8. The method according to claim 1, wherein the acidic soft drink further comprises 0.1 to 2 g/serving vitamin C.

9. The method according to claim 1, wherein the serving of acidic soft drink in the range of 0.1 to 0.8 liters.

10. The method according to claim 1, wherein the acidic soft drink and the gluten-digesting enzyme are consumed in a ratio of 0.1 L/10,000 Protease Picomole International units to 1 L/10,000 Protease Picomole International units.

* * * * *